United States Patent [19]
Henrick et al.

[11] Patent Number: 5,991,366
[45] Date of Patent: Nov. 23, 1999

[54] TELEPHONE INFORMATION RETRIEVAL SYSTEM

[75] Inventors: Robert F. Henrick, Basking Ridge; Ralph J. Weaver, III, Farmingdale, both of N.J.

[73] Assignee: Lucent Technologies Inc., Murray Hill, N.J.

[21] Appl. No.: 08/744,395

[22] Filed: Nov. 7, 1996

[51] Int. Cl.⁶ .................................................... H04M 1/64
[52] U.S. Cl. .................................... 379/88.18; 379/88.27; 379/93.12; 379/352
[58] Field of Search ................................ 379/67, 88, 89, 379/68, 69, 88.18, 88.27, 352, 355, 93.12, 101.01

[56] References Cited

U.S. PATENT DOCUMENTS

| | | |
|---|---|---|
| 4,602,129 | 7/1986 | Matthews et al. ........................ 379/84 |
| 5,247,575 | 9/1993 | Sprague et al. ............................. 455/2 |
| 5,335,277 | 8/1994 | Harvey et al. ............................. 380/20 |
| 5,390,237 | 2/1995 | Hoffman, Jr. et al. .................... 379/87 |
| 5,483,577 | 1/1996 | Gulick ....................................... 379/67 |
| 5,526,423 | 6/1996 | Ohuchi et al. ............................. 379/67 |
| 5,623,538 | 4/1997 | Petty ..................................... 379/88.18 |

*Primary Examiner*—Fan S. Tsang

[57] ABSTRACT

A telephone answering machine (TAS) is preprogrammed to place calls automatically to a service bureau (SB) over a telephone or other suitable communications network. In response to the calls, the SB generates and transmits messages (e.g., compressed digital audio messages) to the TAS for recording and subsequent playback by a user. In this way, users can routinely receive information useful to their daily lives.

17 Claims, 2 Drawing Sheets

TELEPHONE INFORMATION RETRIEVAL SYSTEM

BACKGROUND OF THE INVENTION

1. Field of the Invention

The present invention relates to integrated network and consumer device communications systems involving devices with store and playback capability, and, in one embodiment, to telephone answering systems such as consumer telephone answering machines.

2. Description of the Related Art

Telephone answering systems (TASs) are currently present in over 50% of American households. These answering machines serve the purpose of recording incoming telephone messages received over a telephone network.

Many people routinely gather information useful in their daily lives, including weather forecasts, traffic reports, sports scores, stock market quotes, and lottery numbers. This information is often gathered by tuning in to a radio or television station at an appropriate time or by manually placing a call to a service bureau programmed with prerecorded messages.

The present invention is directed to improvements that enable consumer telephone answering systems to assist people in gathering and accessing information useful in their daily lives.

Further objects and advantages of this invention will become apparent from the detailed description which follows.

SUMMARY OF THE INVENTION

The present invention is directed to a telephone answering system. According to one embodiment, the telephone answering system comprises a processor, a network interface, and a message storage device. The processor automatically places a call over a communications network to a service bureau via the network interface, the processor receives a message from the service bureau over the communications network via the network interface in response to the call, and the processor stores the message in the message storage device for subsequent playback by a user.

The present invention is also directed to a service bureau. According to one embodiment, the service bureau comprises a processor and a network interface. The processor receives a call over a communications network from a telephone answering system via the network interface and the processor transmits a message over the communications network to the telephone answering machine via the network interface in response to the call.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

The present invention is directed to a telephone answering system (TAS) that automatically places calls to a service bureau (SB) over a telephone network in order to obtain preselected categories of information. The SB responds by transmitting to the TAS audio messages containing the requested information, either by audio playback or transfer of digital files representing compressed audio information. The audio messages are stored by the TAS for future playback by a user, just like regular voice messages from incoming calls.

Figure 1:
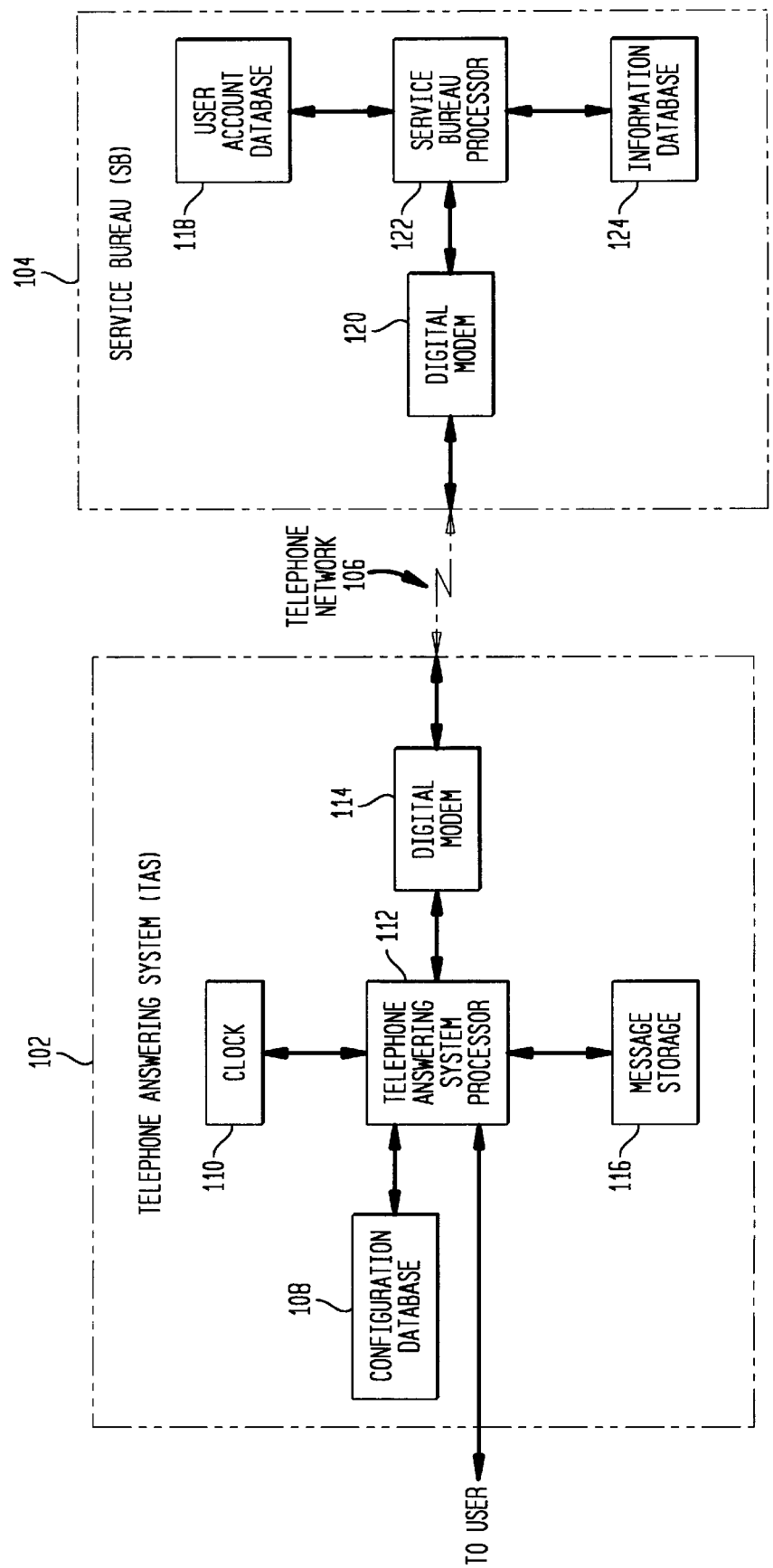
FIG. 1 is a block diagram of a telephone answering system and a service bureau, according to one embodiment of the present invention.

Referring now to FIG. 1, there is shown a block diagram of telephone answering system 102 and service bureau 104, according to one embodiment of the present invention involving digital file transfer. TAS 102 and SB 104 communicate over telephone network 106. TAS 102 comprises configuration database 108, clock 110, TAS processor 112, digital modem 114, and message storage device 116. Digital modem 114 may be implemented in software in the processor of a conventional telephone answering system, and configuration database 108 and message storage 116 in the digital memory of such a conventional system. SB 104 comprises user account database 118, digital modem 120, SB processor 122, and information database 124. Information database 124 could be obtained from external sources, for example, in one embodiment, from Internet Servers. Digital modem 120 may be one of a pool of digital modems in SB 104.

Figure 2:
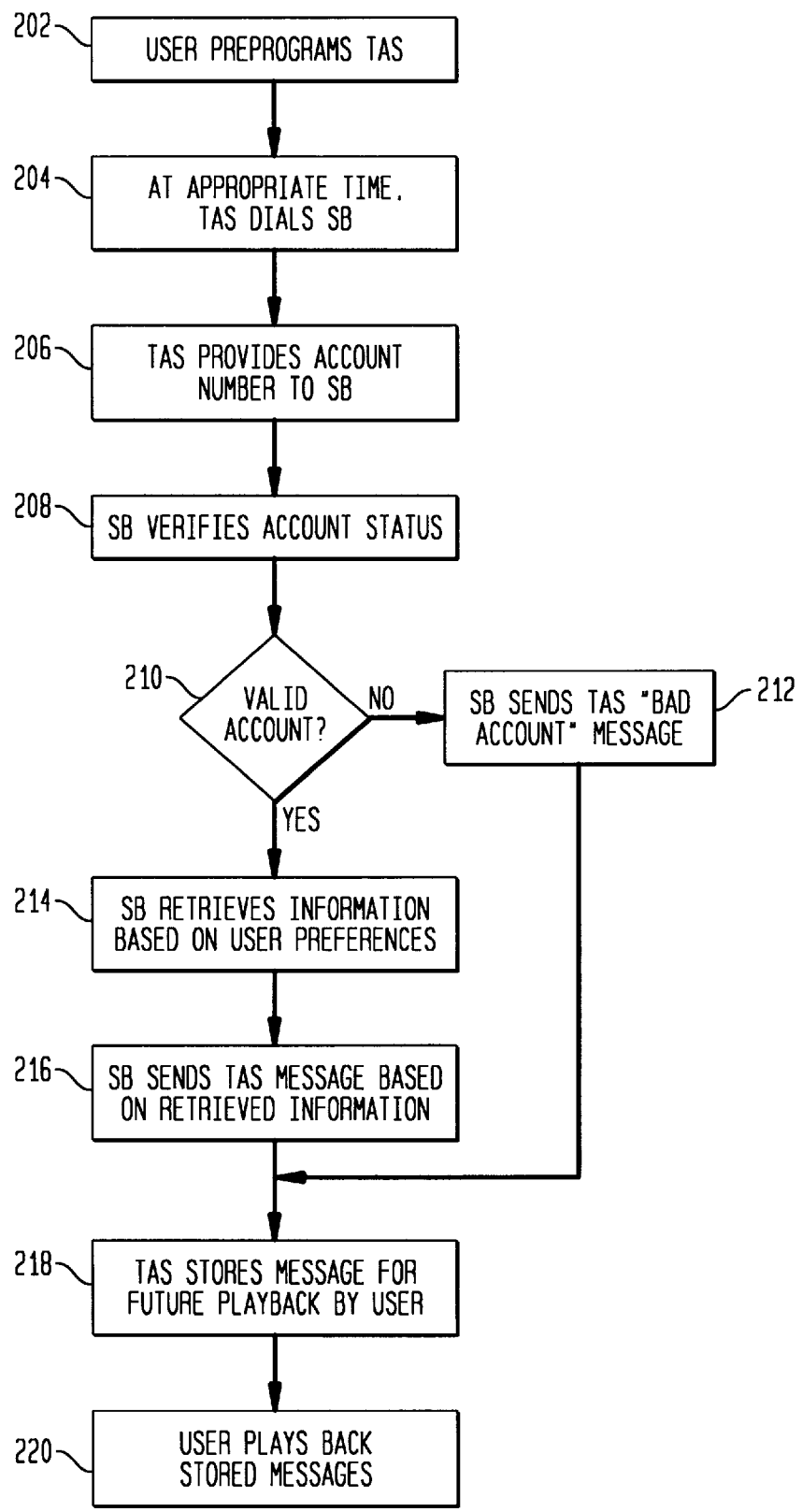
FIG. 2 is a flow diagram of the processing implemented by the TAS and the SB of FIG. 1.

Referring now to FIG. 2, there is shown a flow diagram of the processing implemented by TAS 102 and SB 104 of FIG. 1, according to one embodiment of the present invention. A user preprograms TAS 102 by storing appropriate information in configuration database 108 (step 202 of FIG. 2). This information includes the user's account number, at least one phone number for SB 104, and a call schedule. The call schedule identifies the times (and/or frequencies) for placing calls to SB 104.

At an appropriate time, TAS 102 places a call to SB 104 over telephone network 106 via digital modem 114 (step 204). The timing of the call is based on the current time provided by clock 110 to TAS processor 112 as well as the call schedule accessed by TAS processor 112 from configuration database 108. TAS 102 transmits the user's account number (retrieved by TAS processor 112 from configuration database 108) to SB 104 over telephone network 106 via digital modem 114 (step 206).

SB processor 122 checks the validity of the user's account by accessing information about the account status as stored in user account database 118 (step 208). If the account number is not valid or if the account does not have an active status (step 210), then SB 104 sends a prerecorded message via digital modem 120 to TAS 102 over telephone network 106 indicating that access to an invalid account was attempted (step 212). In this case, processing then continues to step 218, which is described below.

If the account is valid (step 210), then SB processor 122 retrieves user preference information from user account database 118 (step 214). In addition to the user's account number and account status, user account database 118 contains the name, billing address, and preferences for each user. The user preferences identify the categories of information preselected by the user. These user preferences are used to determine which information to include in the message generated by SB processor 122 for transmission to TAS 102 over telephone network 106 via digital modem 120 (step 216). The user preferences may be any type of information, including, but are not limited to, weather forecasts, traffic reports, sports scores, stock market quotes, and lottery numbers. Moreover, the user preferences may be tailored to the individual user. For example, a particular user may be interested in sports scores for only specific teams. All of these user preferences are preselected for the user for storage in user account database 118.

TAS processor 112 stores each message received from SB 104 over telephone network 106 via digital modem 114 to message storage device 116 (step 218). At a later time, a user can play back the stored message just like it was a regular message from a normal incoming call (step 220). The stored messages may be compressed digital messages that are decompressed by TAS processor 112 for playback. These compressed messages may be compressed by SB processor 122 prior to transmission to TAS 102. Alternatively, the messages received from SB 104 may be uncompressed messages that are compressed by TAS processor 112 for storage in the same way that regular audio messages from normal incoming calls are compressed for storage. In still other embodiments, the messages may be text files that are converted to audio messages by TAS processor 112 using conventional text-to-speech conversion technology.

In one embodiment of the present invention, an account is established by a user placing a call to a customer representative who gathers the necessary information on user preferences and desired call schedule as well as billing information for a pay service. When the account is established at the SB, an account establishment message is transmitted from the SB to the TAS over the telephone network. The account establishment message contains an encrypted account number for the user as well as the preprogrammed call schedule for storage in the configuration database of the TAS.

The telephone answering systems of the present invention may be either separate answering machines, answering machines that are part of personal computer (PC) systems, network-based public branch exchange (PBX) systems, or portable message units. The telephone network may be any suitable analog or digital communications medium, including, but not limited to, plain old telephone service (POTS), integrated services digital network (ISDN), local or wide area networks (LAN/WAN), cellular networks, or other two-way radio or satellite networks. Similarly, in alternative embodiments, the digital modems may be replaced by other network interfaces as appropriate, including analog devices.

In one embodiment, the clock, TAS processor, digital modem, and message storage device of the telephone answering system of the present invention are similar to conventional digital answering machines, such as the LUCENT Technologies' 1545, 1750, and 1820 digital answering machines. Differences lie in how the TAS processor is programmed to operate in conjunction with a configuration database. In one embodiment of the present invention, the TAS has a digital display that identifies to the user the type of information contained in a message received from an SB and the time the message was received.

It will be understood that the TASs of the present invention may be preprogrammed to call automatically one or more different numbers to access one or more different service bureaus to gather different sets of information at different times throughout the day. Although in one embodiment, the TAS is able to place preprogrammed calls automatically, TASs of the present invention can also support manual calls to service bureaus at any time.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A service bureau, comprising:
   a processor;
   an account database; and
   a network interface, wherein:
      the processor receives a first call over a communications network from a first telephone answering system via the network interface requesting specific user-selected information for a first user;
      the processor accesses the account database to identify one or more categories of information corresponding to the first user;
      the processor gathers the specific user-selected information based on, the one or more categories corresponding to the first user;
      the processor transmits a first message over the communications network to the first telephone answering system via the network interface in response to the first call, wherein the first message comprises the specific user-selected information for the first user;
      the processor receives a second call over the communications network from a second telephone answering system via the network interface requesting specific user-selected information for a second user;
      the processor accesses the account database to identify one or more categories of information corresponding to the, second user;
      the processor gathers the specific user-selected information based on the one or more categories corresponding to the second user; and
      the processor transmits a second message over the communications network to the second telephone answering system via the network interface in response to the second call, wherein the second message comprises the specific user-selected information for the second user, wherein the one or more categories of information corresponding to the first user are different from the one or more categories of information corresponding to the second user.

2. The invention of claim 1, further comprising an information database, wherein the processor accesses message information from the information database in order to generate each message.

3. The invention of claim 1, wherein the processor verifies validity of a user account corresponding to each call using the account database.

4. The invention of claim 1, wherein the network interface is a digital modem.

5. The invention of claim 1, wherein each message is a compressed digital message.

6. The invention of claim 1, wherein each message is an audio message.

7. The invention of claim 1, further comprising an information database, wherein:
   the processor verifies validity of a user account corresponding to each call using the account database;
   the processor accesses message information from the information database in order to generate each message;
   the network interface is a digital modem; and
   each message is a compressed digital audio message.

8. A communications system comprising a service bureau and two or more telephone answering systems, wherein:
   a first telephone answering system automatically places a first call over a communications network to the service bureau to request specific user-selected information for a first user;

a second telephone answering system automatically places a second call over the communications network to the service bureau to request specific user-selected information for a second user, wherein the specific user-selected information for the first user is different from the specific user-selected information for the second user;

the service bureau accesses an account database to identify one or more categories of information corresponding to the first user;

the service bureau gathers the specific user-selected information based on the one or more categories corresponding to the first user;

the service bureau transmits a first message over the communications network to the first telephone answering system in response to the first call, wherein the first message comprises the specific user-selected information for the first user;

the service bureau accesses an account database to identify one or more categories of information corresponding to the second user;

the service bureau gathers the specific user-selected information based on the one or more categories corresponding to the second user;

the service bureau transmits a second message over the communications network to the second telephone answering system in response to the second call, wherein the second message comprises the specific user-selected information for the second user;

the first telephone answering system receives the first message from the service bureau over the communications network and stores the first message for subsequent playback by the first user; and the second telephone answering system receives the second message from the service bureau over the communications network and stores the second message for subsequent playback by the second user.

9. The invention of claim 8, wherein the first telephone answering system comprises:

a processor;

a network interface; and a message storage device, wherein:

the processor automatically places the first call over the communications network to the service bureau via the network interface to request the specific user-selected information for the first user;

the processor receives the first message from the service bureau over the communications network via the network interface in response to the first call; and the processor stores the first message in the message storage device for subsequent playback by the first user.

10. The invention of claim 9, wherein the first telephone answering system further comprises a clock, wherein:

the clock provides timing information to the processor; and the processor determines when to place the first call based on the timing information.

11. The invention of claim 9, the first telephone answering system further comprises a configuration database, wherein the processor accesses the configuration database to retrieve information about the first call.

12. The invention of claim 11, wherein the information comprises at least one of a telephone number for the service bureau, a user account number, and a call schedule.

13. The invention of claim 9, wherein the network interface is a digital modem.

14. The invention of claim 9, wherein the first message is a compressed digital message and the processor decompresses the compressed digital message for playback to the first user.

15. The invention of claim 9, wherein the first message is an audio message.

16. The invention of claim 9, wherein the first telephone answering system further comprises a clock and a configuration database, wherein:

the clock provides timing information to the processor;

the processor accesses the configuration database to retrieve information about the first call, wherein the information comprises at least one of a telephone number for the service bureau, a user account number, and a call schedule;

the processor determines when to place the first call based on the timing information and the call schedule;

the network interface is a digital modem;

the first message is a compressed digital audio message; and the processor decompresses the compressed digital message for playback to the first user.

17. The invention of claim 8, wherein the first and second telephone answering systems are connected to standard telephone lines and are remotely located with respect to one another.

\* \* \* \* \*